US008195786B2

(12) United States Patent
Kitts

(10) Patent No.: US 8,195,786 B2
(45) Date of Patent: Jun. 5, 2012

(54) NETWORK REAL ESTATE ANALYSIS

(75) Inventor: Brendan J. Kitts, Cambridge, MA (US)

(73) Assignee: Open Text S.A., Luxembourg (LU)

( * ) Notice: Subject to any disclaimer, the term of this patent is extended or adjusted under 35 U.S.C. 154(b) by 0 days.

(21) Appl. No.: 13/190,166

(22) Filed: Jul. 25, 2011

(65) Prior Publication Data

US 2011/0282991 A1 Nov. 17, 2011

Related U.S. Application Data

(63) Continuation of application No. 12/684,609, filed on Jan. 8, 2010, now Pat. No. 8,024,448, which is a continuation of application No. 10/202,742, filed on Jul. 25, 2002, now Pat. No. 7,660,869, which is a continuation-in-part of application No. 09/934,415, filed on Aug. 21, 2001, now abandoned.

(60) Provisional application No. 60/308,075, filed on Jul. 26, 2001, provisional application No. 60/226,798, filed on Aug. 21, 2000.

(51) Int. Cl.
*G06F 15/173* (2006.01)
(52) U.S. Cl. ........................ 709/223; 709/203; 709/217
(58) Field of Classification Search .................. 709/203, 709/217, 219, 223, 224
See application file for complete search history.

(56) References Cited

U.S. PATENT DOCUMENTS

| 5,675,510 | A | * | 10/1997 | Coffey et al. | 709/224 |
|---|---|---|---|---|---|
| 5,870,559 | A | * | 2/1999 | Leshem et al. | 709/224 |
| 6,112,238 | A | * | 8/2000 | Boyd et al. | 709/224 |
| 6,144,962 | A | * | 11/2000 | Weinberg et al. | 1/1 |
| 6,237,006 | B1 | * | 5/2001 | Weinberg et al. | 707/797 |
| 6,804,701 | B2 | * | 10/2004 | Muret et al. | 709/203 |
| 7,225,246 | B2 | * | 5/2007 | Shapira | 709/223 |
| 7,277,939 | B2 | * | 10/2007 | Fukumoto et al. | 709/224 |
| 7,801,950 | B2 | * | 9/2010 | Eisenstadt et al. | 709/203 |
| 2001/0037321 | A1 | * | 11/2001 | Fishman et al. | 705/500 |
| 2002/0070953 | A1 | * | 6/2002 | Barg et al. | 345/700 |
| 2002/0143933 | A1 | * | 10/2002 | Hind et al. | 709/224 |

* cited by examiner

*Primary Examiner* — Lashonda Jacobs
(74) *Attorney, Agent, or Firm* — Sprinkle IP Law Group

(57) ABSTRACT

A method can be used to analyze the "real-estate" performance of content items within a network site. The method can comprise determining the click distance to reach each content item and determining the performance of each content item. The method can also comprise calculating a predicted value for performance based on statistical relationship between location and performance observed in a population of content items. The method can comprise comparing the predicted and actual performance. If a content item has an actual performance greater than its predicted performance, then it may be promoted to a better location in the site and the converse for poorer performing content.

21 Claims, 5 Drawing Sheets

*FIG. 5*

| CLICK NUMBER | SESSION | VISITOR | TIME | CONTENT |
|---|---|---|---|---|
| 1 | 1175673 | 212859 | 10/1/99 0:05 | /index.html\|item=-\|- |
| 2 | 1175673 | 212859 | 10/1/99 0:05 | /cpi/taf/auction.taf\|item=-\|f=list |
| 3 | 1175673 | 212859 | 10/1/99 0:06 | /cpi/taf/auction.taf\|item=29\|f=items |
| 4 | 1175673 | 212859 | 10/1/99 0:06 | /cpi/taf/auction.taf\|item=19\|f=items |
| 5 | 1175673 | 212859 | 10/1/99 0:06 | /cpi/taf/auction.taf\|item=10\|f=items |
| 6 | 1175673 | 212859 | 10/1/99 0:07 | /cpi/taf/auction.taf\|item=20\|f=items |
| 7 | 1175673 | 212859 | 10/1/99 0:07 | /cpi/taf/displayitem.taf\|item=39409\|- |
| 8 | 1175673 | 212859 | 10/1/99 0:07 | /cpi/taf/auction.taf\|item=39409\|f=bid |
| 9 | 1175673 | 212859 | 10/1/99 0:08 | /cpi/taf/auction.taf\|item=39409\|f=submitbid |
| 10 | 1175673 | 212859 | 10/1/99 0:08 | /cpi/taf/auction.taf\|item=20\|f=items |
| 11 | 1175673 | 212859 | 10/1/99 0:08 | /cpi/taf/auction.taf\|item=39409\|f=bid |
| 12 | 1175673 | 212859 | 10/1/99 0:09 | /cpi/taf/auction.taf\|item=3\|f=items |
| 13 | 1175673 | 212859 | 10/1/99 0:09 | /cpi/taf/auction.taf\|item=14\|f=items |
| 14 | 1175673 | 212859 | 10/1/99 0:10 | /cpi/taf/auction.taf\|item=1\|f=items |

*FIG. 6*

| CLICK | SESSION | VISITOR | TIME | CONTENT |
|---|---|---|---|---|
| 1 | 1175678 | 18549 | 10/1/99 0:06 | /cpi/html/powertools/index.html\|item=-\|- |
| 2 | 1175678 | 18549 | 10/1/99 0:07 | /index.html\|item=-\|- |
| 3 | 1175678 | 18549 | 10/1/99 0:07 | /cpi/html/grabbag/index.html\|item=-\|- |
| 4 | 1175678 | 18549 | 10/1/99 0:08 | /cpi/taf/catreq.taf\|item=-\|f=catform |
| 5 | 1175678 | 18549 | 10/1/99 0:12 | /cpi/taf/catreq.taf\|item=-\|ActionArg=2 |

| RANK | CONTENT ITEM | HITS | LOCATION | Hits/E[hits] |
|---|---|---|---|---|
| 1 | /cpi/taf/basket.taf\|actionarg=add | 2990 | 12.99775 | 9.603032 |
| 2 | /cpi/taf/headsearch.taf\|function=search | 2898 | 10.88959 | 9.307554 |
| 3 | /cpi/taf/displayitem.taf\|function=search | 969 | 14.63426 | 4.437626 |
| 4 | /cpi/taf/customer.taf\|actionarg=1 | 559 | 25.50502 | 3.845625 |
| 5 | /cpi/taf/displayitem.taf\|- | 19496 | 5.810787 | 3.500004 |
| 6 | HAND TOOLS | 805 | 16.51225 | 3.363135 |
| 7 | /cpi/taf/fbc.taf\|f=list | 685 | 14.6 | 3.137021 |
| 8 | /cpi/taf/customer.taf\|actionarg=2 | 472 | 28.43243 | 3.03212 |
| 9 | POWER ACCY | 472 | 20.71705 | 2.844744 |
| 10 | HOME PROD | 369 | 19.35498 | 2.717231 |
| 11 | /cpi/ssl/payment.taf\|actionarg=order | 446 | 20.96667 | 2.688042 |
| 12 | /cpi/taf/catreq.taf\|f=catform | 775 | 11.95198 | 2.48908 |
| 13 | /cpi/ssl/payment.taf\|- | 477 | 17.93048 | 2.121131 |
| 14 | /cpi/taf/category.taf\|-\|RECONED | 564 | 17.59316 | 1.875748 |
| 15 | RECONED | 564 | 17.59316 | 1.875748 |
| 16 | /cpi/taf/fbc.taf\|- | 404 | 15.19626 | 1.850156 |
| 17 | OUTDOOR PROD | 413 | 17.99197 | 1.836535 |
| 18 | /cpi/taf/hotlinks.taf\|- | 413 | 18.11429 | 1.836535 |
| 19 | GARDEN PROD | 390 | 18.41204 | 1.734258 |

FIG. 10

| RANK | CONTENT ITEM | HITS | LOCATION | Hits/E[hits] |
|---|---|---|---|---|
| 1 | /cpi/taf/auction.taf\|f=loginform | 75 | 10.28 | 0.013464 |
| 2 | /cpi/taf/auction.taf\|f=bid | 100 | 9.395349 | 0.017952 |
| 3 | /cpi/taf/auction.taf\|f=login | 108 | 9.978261 | 0.019389 |
| 4 | /cpi/html/aboutus/main.html\|- | 90 | 13.18 | 0.025914 |
| 5 | /cpi/taf/itc.taf\|f=logon | 216 | 13.72727 | 0.062194 |
| 6 | /cpi/html/grabbag/index.html\|- | 334 | 13.42268 | 0.09617 |
| 7 | /cpi/html/newitems/index.html\|- | 422 | 13.232 | 0.121509 |
| 8 | /cpi/retailstores/index.html\|- | 514 | 13.95286 | 0.147999 |
| 9 | /cpi/html/reconcntr/index.html\|- | 544 | 13.98754 | 0.156637 |
| 10 | /cpi/taf/auction.taf\|f=list | 897 | 9.77957 | 0.161033 |
| 11 | /cpi/html/associate/home.taf\|- | 66 | 12.97059 | 0.211973 |
| 12 | /cpi/taf/auction.taf\|f=mybids | 69 | 11.47826 | 0.221608 |
| 13 | /cpi/html/paintsupp/index.html\|- | 85 | 17.33333 | 0.282693 |
| 14 | /cpi/taf/search.taf\|- | 1028 | 13.50424 | 0.295998 |

FIG. 11

NETWORK REAL ESTATE ANALYSIS

CROSS-REFERENCE TO RELATED APPLICATIONS

This is a continuation of and claims a benefit of priority under 35 U.S.C. §120 of the filing date of U.S. patent application Ser. No. 12/684,609, entitled "NETWORK REAL ESTATE ANALYSIS" by Brendan J. Kitts, filed Jan. 8, 2010 issued as U.S. Pat. No. 8,024,448 on Sep. 20, 2011, which is a continuation of U.S. patent application Ser. No. 10/202,742, entitled "NETWORK REAL ESTATE ANALYSIS" by Brendan J. Kitts, filed Jul. 25, 2002, issued as U.S. Pat. No. 7,660,869 on Feb. 9, 2010, which in turn claims a benefit of priority under 35 U.S.C. §120 and is a continuation-in-part of U.S. patent application Ser. No. 09/934,415, entitled "A SYSTEM AND METHOD FOR GRAPHICALLY ANALYZING PRODUCT INTERACTIONS" by Brendan J. Kitts, filed Aug. 21, 2001, now abandoned, which in turn claims priority under 35 U.S.C. §119(e) to U.S. Provisional Patent Application Nos. 60/308,075, entitled "VISUALIZATION AND ANALYSIS OF USER CLICKPATHS" by Brendan J. Kitts, filed Jul. 26, 2001, and 60/226,798, entitled "METHOD AND SYSTEM FOR GRAPHICALLY REPRESENTING CUSTOMER AFFINITIES" by Brendan J. Kitts, filed Aug. 21, 2000. This application is also related to U.S. patent application Ser. No. 10/202,741, filed Jul. 25, 2002, issued as U.S. Pat. No. 7,278,105 on Oct. 2, 2007, entitled "VISUALIZATION AND ANALYSIS OF USER CLICKPATHS" by Brendan J. Kitts. All applications listed in this paragraph are fully incorporated herein by reference.

TECHNICAL FIELD

This invention relates in general to methods and data processing system readable storage media, and more particularly, to methods of analyzing performance of content within network sites and data processing system readable storage media having software code for carrying out those methods.

DESCRIPTION OF THE RELATED ART

The placement of content on a website can be the difference between a successful and an unproductive web site. Previous work has not yet revealed an ideal method for placing content. For example, eye trackers have been used by some researchers to examine what attracts the eye to different features on a page. Perhaps this could be used to move higher revenue advertisements into more attractive page locations. In different work, Huberman et al. (1998) found that the probability of a web surfer remaining on a site declines with each additional click. Perhaps this might indicate that high revenue content could be placed near the entry pages of the site. However, whilst both are interesting concepts, they do not on their own provide a way for optimizing site layout. A general purpose method is needed that can help determine where content should be placed in a web site so as to maximize site performance.

SUMMARY OF THE DISCLOSURE

Methods and data processing system readable storage media have been created to analyze the "real-estate performance" of a content item within a network site.

In one set of embodiments, a data processing system readable storage medium can have code embodied therein, and the code can be used to analyze the performance of content item(s) within a network site. The code can comprise an instruction for determining a location of a content item within a network site. The code can also comprise an instruction for determining a predicted performance associated with the content item. The predicted performance may be a function of the location of the content item. The code can further comprise an instruction for comparing the predicted number and an actual number for the performance statistic for the content item. The method may also comprise moving the content item to a different location.

In another set of embodiments, the code can comprise an instruction for determining locations of content items within a network site. The code can also comprise an instruction for generating a graph including information related to the locations and performance of content items.

The code can be described with respect to activities performed as a method. While the use of a computer program facilitates the use of the method, at least some of the acts used in the method may be performed by human(s). For example, determining whether to move the location of content and where may be better performed by a human. The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures, in which:

FIGS. 5 and 6 include examples of data that may be collected within a network site log.

FIGS. 10 and 11 include illustrations of tables with content items with the highest ratios and lowest ratios of "hits/E[hits]".

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings.

Overview of the Methodology

Figure 3:
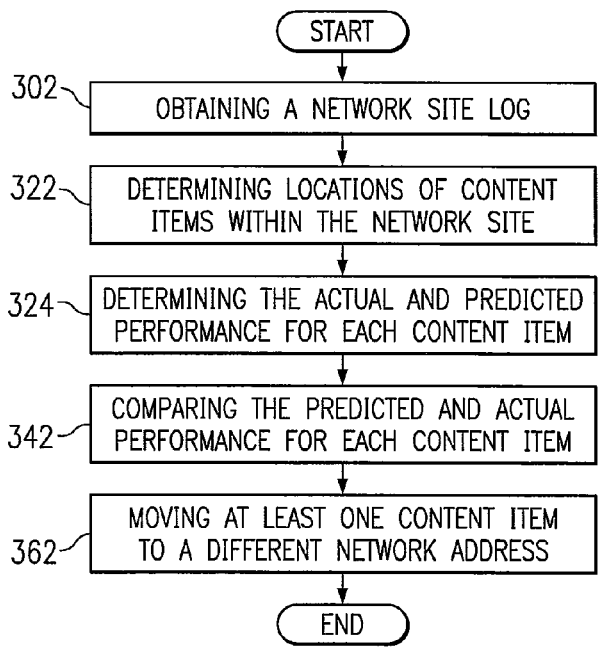
FIGS. 3 and 4 include process flow diagrams for analyzing performance of content item(s) within a network site.
Figure 4:
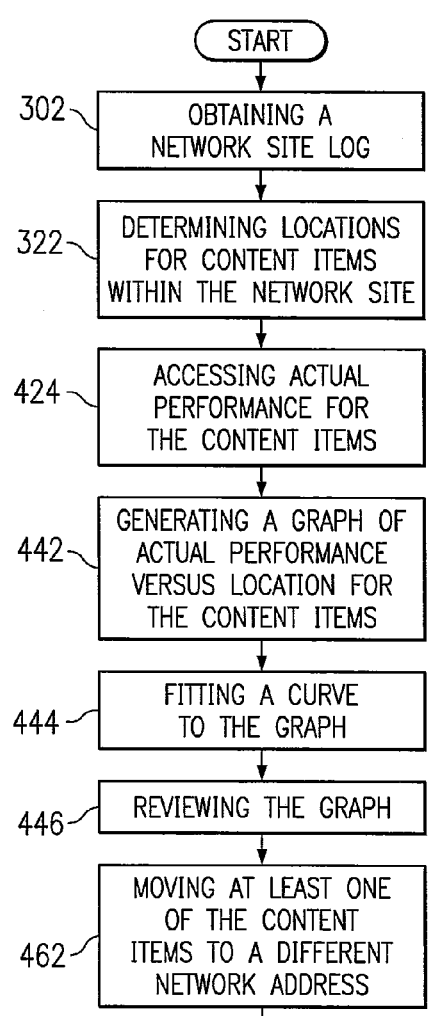

The embodiments shown in FIGS. 3 and 4 can be used to analyze the real-estate performance of a content item within a network site.

In the embodiment shown in FIG. 3, the method can comprise obtaining a network site log (block 302), determining locations of content items within the network site (block 322), and the actual and predicted performance for each content item (block 324). The method may further comprise comparing the predicted and actual performances (block 342). The method can also comprise moving at least one content item to a different network address (block 362).

In an alternative embodiment shown in FIG. 4, the method can comprise obtaining a network site log (block 302), determining locations for content items within the network site (block 322) and accessing the actual performance of the content items (block 424). The method can still further comprise generating a graph of actual performance versus location for the content items (block 442), fitting a curve to the graph (block 444), and reviewing the graph (block 446). The method can comprise moving at least one of the content items to a different network address (block 462).

Clarification of Terms

The terms below are defined to aid in understanding the descriptions that follow. The examples given within this section are for purposes of illustration and not limitation.

A "clickstream" is a (possibly incomplete) sequence of content that has been requested by a customer from a network site.

A "content item" may be any set of information that is accessible via a network. Examples can include a news story, a banner advertisement, a group of mpeg movies, an audio track, a list of books, and so on. A content item may be displayed after a request to one or more network addresses. Determining what network address to assign to a content item on is a subject of this patent. Let $c_i$ be notation to designate the ith content item on the site.

The "location" of a content item (or network address) may be the number of clicks it takes, on average, for a customer to reach that content item (or network address), after the customer's first appearance on the site during a session. For example, if the average customer first encounters the search page on the fifth ($5^{th}$) click of his or her clickstream, the page would have a real-estate location of five (5). Note that the number of clicks does not take into account the particular path taken, which may be different in each case. Let $L(c_i)$ be used as a symbol to denote the location of content $c_i$.

A "network" may be an interconnected set of server and client computers over a public or private communications medium (e.g., Internet, Arpanet).

A "network activity log" is a database, file, or other storage medium that records user activity on a network. Let X be notation to designate a set of all clickstreams in a network activity log.

A "network address" is a string that users may type or click to access network accessible information. Uniform Resource Locators ("URLs") are examples of network addresses. Multiple content items may be served after a request to a single network address. For example, different content may appear within different frames on a page referenced by a single network address. Let $a_j$ be notation to designate the jth network address on the site. Each content item must reside on one or more network addresses.

A "network site" may be a collection of network addresses that may be served to a requesting computer.

A "performance statistic" may be a measure of the effectiveness of a content item in achieving business objectives. Examples of a performance statistic may include the number of visitors requesting $c_i$ per hour, the total revenue generated by $c_i$ per day, the number of requests per hour for $c_i$, the clickthrough rate (number of clicks divided by number of exposures) of visitors onto $c_i$, profit generated by $c_i$ per day, quantity of goods purchased in the session after requesting $c_i$ per day, and so on. Let $P(c_i)$ be used to denote the performance of content item $c_i$.

A "session" may be the complete clickstream (and associated client, server, and network information) of a visitor during a single visit at a network site. A session may begin when a server receives its first request from a visitor, and end when there is 30 minutes or more of inactivity from the visitor. The notation $X_i \in X$ will be used to designate the ith session of the network activity log X.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Hardware and Software

Figure 1:
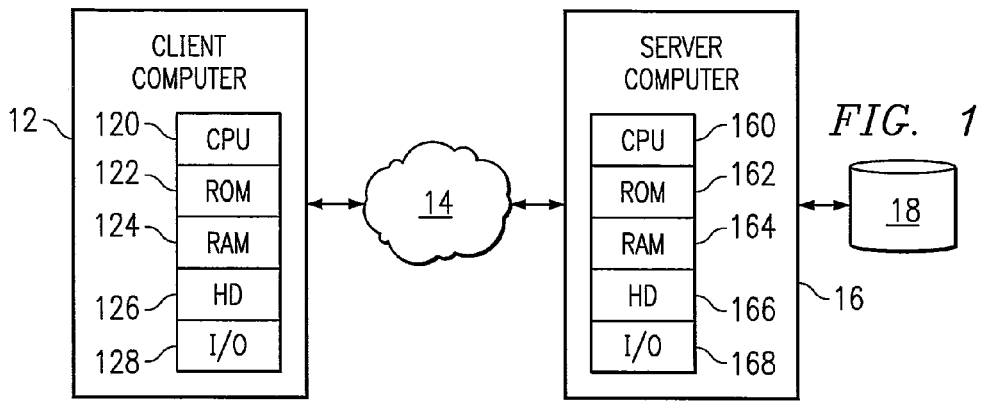
FIG. 1 includes an illustration of a client computer and a server computer as part of a computer network.

Before discussing embodiments of the present invention, a hardware architecture for using embodiments is described. FIG. 1 illustrates an exemplary architecture and includes a client computer 12 that is bi-directionally coupled to a network 14, and a server computer 16 that is bi-directionally coupled to the network 14 and a database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O 128 can include a keyboard, monitor, printer, electronic pointing device (e.g., mouse, trackball, etc.), or the like. The server computer 16 can include a CPU 160, ROM 162, RAM 164, HD 166, and I/O 168.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable storage medium. These memories may be internal or external to the computers 12 and 16.

Figure 2:
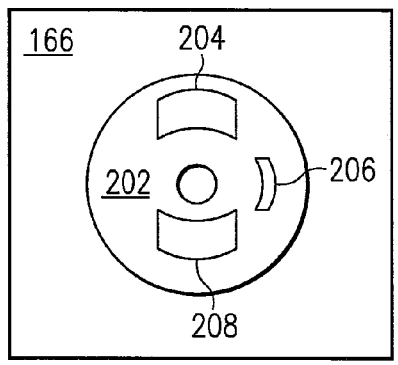
FIG. 2 includes an illustration of a data processing system storage medium including software code having instructions in accordance with an embodiment of the present invention.

The methods described herein may be implemented in suitable software code that may reside within ROM 122 or 162, RAM 124 or 164, or HD 126 or 166. In addition to those types of memories, the instructions in an embodiment of the present invention may be contained on a data storage device with a different data processing system readable storage medium, such as a floppy diskette. FIG. 2 illustrates a combination of software code elements 204, 206, and 208 that are embodied within a data processing system readable storage medium 202 on a HD 166. Alternatively, the instructions may be stored as software code elements on a DASD array, magnetic tape, floppy diskette, optical storage device, or other appropriate data processing system readable storage medium or storage device.

In an illustrative embodiment of the invention, the computer-executable instructions may be lines of compiled $C^{++}$, Java, or other language code. Other architectures may be used. For example, the functions of the client computer 12 may be incorporated into the server computer 16, and vice versa. Further, other client computers (not shown) or other server computers (not shown) similar to client computer 12 and server computer 16, respectively, may also be connected to the network 14. FIGS. 3 and 4 include illustrations, in the form of flowcharts, of the structures and operations of such software programs.

Communications between the client computer 12 and the server computer 16 can be accomplished using electronic, optical, radio-frequency, or other signals. When a user (human) is at the client computer 12, the client computer 12 may convert the signals to a human understandable form when sending a communication to the user and may convert input from a human to appropriate electronic, optical, radio-frequency, or other signals to be used by the client computer 12 or the server computer 16.

The Network Activity Log

User behavior while "surfing" a network site may be collected into repositories known as network activity logs. For example, if Hypertext Transfer network Protocol (HTTP) were to be used, a user at a client computer 12 may send a request for information in the form of a request for a network address over the network 14 to the server computer 16. In response to the request, the server computer 16 sends information corresponding to the requested content over the network 14 to the client computer 12 or information that the request could not be fulfilled (e.g., a "Page not found" error). Other users, similar to the user at client computer 12, may be at other client computers and may also make requests via the network 14 and server computer 16.

Whilst serving the requested content, the details of the user's request may be recorded in a network activity log (e.g., located within database or file 18). Network activity logs may record a range of information including the date-of-request, time, bytes transferred, address of requesting computer, status code, and requested content/page/file/network address.

For purposes of later elucidation, assume that the records from a network activity log have been placed into a table called network_activity_log. Each row of the table is a request. The table may have the following columns: session, time, click_number, visitor, and content, where session is a code identifying a session, click_number is an integer greater than or equal to zero which is the number of requests that a user has made prior to the present record, visitor is a code identifying a visitor, and content is a code identifying a content item.

A session $X_i \in X$ contains the clickstream record of a visitor during a single visit at a network site. Typically, a session begins when a server receives its first request from a visitor (user) at client computer 12, and ends when there is 30 minutes or more of inactivity from that same user. Session-determination (the process of assigning unique session ID numbers to each record) may be done in real-time by the server computer 16 or may be done off-line after the network site log has been formed, when more CPU cycles are available to piece together customer behavior after the fact.

FIGS. 5 and 6 may depict example records from such a network activity log. FIG. 5 may indicate that the user is participating in an auction. The user places a bid before leaving the site. FIG. 6 shows another user that is seeking information about some "powertools."

The methods to follow assume that a network activity log like the one described above has been created. The network activity log will be analyzed to determine how users are moving about on the site, and where each content item is "located" within the site.

Methodology

Once a network activity log has been obtained (block 302), four activities may be performed to determine the real-estate performance of content items:

(i) Compute the location of each content item $L(c_i)$ (block 322 in FIGS. 3 and 4).

(ii) Compute or access the actual performance of each content item $P(c_i)$ (block 424 in FIG. 4).

(iii) Compute the predicted performance of each content item $P'(c_i)$ by analyzing the relationship between location and performance in other content items (block 324 in FIG. 3).

(iv) Decide whether each content item is under or over-performing or substantially on par (blocks 342 and 444 of FIGS. 3 and 4, respectively).

(v) If desired, move one or more of the content items to a different network address (blocks 362 and 462 of FIGS. 3 and 4, respectively).

Each of these activities will now be described in detail.

(i) Compute Each Content Item's Location

In one non-limiting embodiment, the location for a content item can be a measure of how many clicks a typical user made to arrive at a specific network address during a session at the network site regardless of path. For example, if the average customer first encounters the search network address on the fifth ($5^{th}$) click of his or her clickstream, then the search page would have a real-estate location of five (5).

Figure 7:
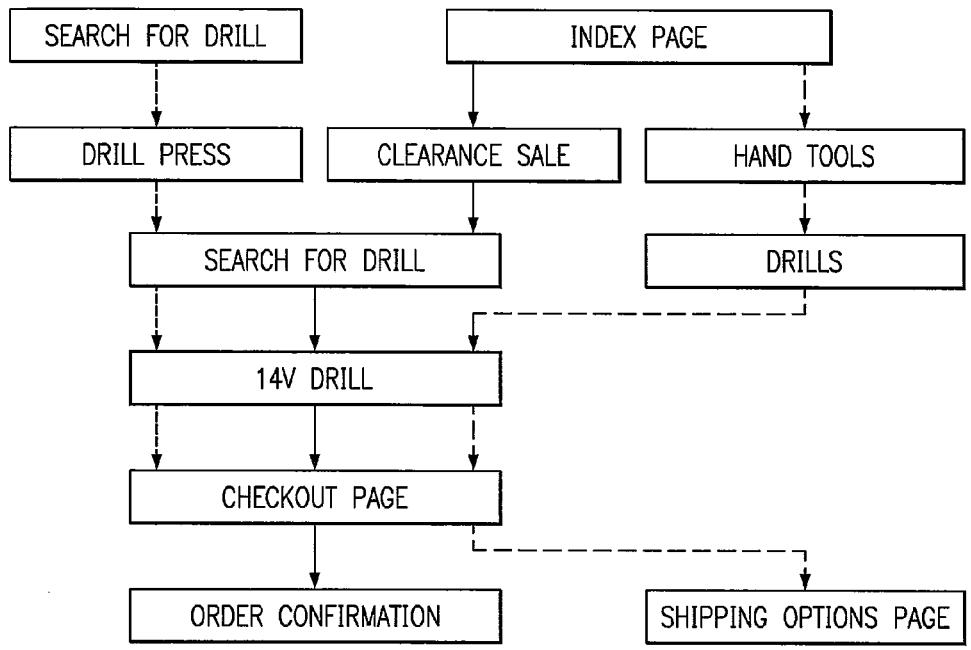
FIG. 7 includes a graph illustrating navigation via different clickpaths to a content item within a network site.

FIG. 7 includes an illustration of the location of "14V Drill" resulting from the clickpaths of three users on a hypothetical site. Although each user may take a different path, it is expected that a user will encounter "14V Drill" page after four (4) clicks. Therefore, the location of "14V Drill" may be referred to as being at the "$4^{th}$ click".

Figure 8:
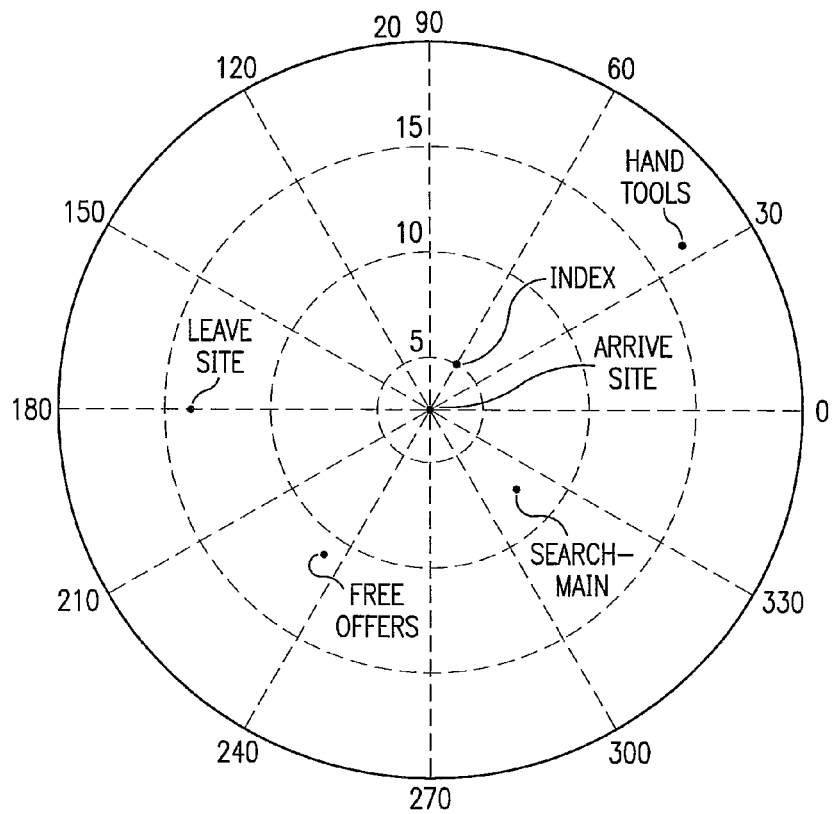
FIG. 8 includes a graph illustrating content items as a function of location within the network site.

Another depiction of locations is shown in FIG. 8. Concentric rings show click distances of 5 clicks, 10 clicks, and 15 clicks into the clickstream. "Arrivesite" is shown at the center, approximately one click into the customer's clickstream. "Leavesite" may occur approximately 14 clicks later. "Freeoffers" may be requested at approximately 11 clicks, "Index" may be requested at approximately 5 clicks, and "search" on the main network address may be requested approximately 8 clicks later. "HAND TOOLS" is approximately 17 clicks from the arrival point, thus, the average user leaves (click distance of approximately 14 clicks) before reaching the hand tools network address (click distance of approximately 17 clicks).

Location may be written as $$L(c_i) = \frac{1}{T(c_i)} \sum_{X_j \in X : c \in X_j} \min \text{click}(c_i \in X_j)$$

where click($c_i$) is the number of requests that a user made prior to requesting content $C_i$; and $T(c_i)$ may be the "traffic" or number of sessions requesting content item $c_i$ and may be written as:

$$T(c_i) = \sum_{X_j \in X} (c_i \in X_j).$$

The method of summarizing a content item's "location" as the typical encounter order of that content item in a visitor's session, is a novel aspect of this invention which has not been developed in prior art.

The following Structured Query Language (SQL) query code may be used to compute location:

```
select session_data.content, avg(session_data.earliest_click) location
from (
    select content, session,
        min(click_number) earliest_click
    from network_activity_log
    group by content,session
) session_data
group by session_data.content
```

(ii) Compute Each Content Item's Actual Performance

The actual performance of a content item $P(c_i)$ can be found by observation of the network activity log. For example, if the performance statistic is the number of sessions requesting a content item or "traffic" (or $T(c_i)$), then this may be computed by adding up the number of sessions requesting content $c_i$ in the network activity log.

$$P(c_i) = T(c_i) = \sum_{X_j \in X} (c_i \in X_j)$$

SQL code for computing traffic is described below.

```
select content, count(distinct session) traffic
from network_activity_log group by content
```

(iii) Compute Each Content Item's Predicted Performance

A key idea of network real-estate analysis, is that content that is buried in the site should receive few requests because a user is likely to leave before reaching it. Content that is near the main network address or home page should receive more requests. The predicted performance for $c_i$ may, therefore, be computed as some function involving $L(c_i)$. In the example below, a spline function has been parameterized to predict traffic performance, given knowledge of $L(c_i)$.

$$P'(c_i) \approx \sum_{d=1}^{D} [G(|r_d - L(c_i)|) \cdot t_d]$$

where

D is the number of basis functions used for the approximation (it is a parameter that may be estimated or fixed);

$G(g) = g^2 * \log(g)$ (other functions are possible);

$r_d$ is the prototypical location value for the $d^{th}$ basis function; and $t_d$ is a parameter value that is chosen to minimize the sum of squared errors below over a large "training set" of content items $$\sum_a \left[ \left( \sum_{d=1}^{D} G(|r_d - L(c_i)|) \cdot t_d \right) - P(c_i) \right]^2.$$

(iv) Compare Actual and Predicted and Improve the Site

Predicted and actual values can be compared quantitatively or visually (blocks 342 of FIG. 3).

(iv-a) Quantitative Method

"Real-estate performance" or REP($c_i$) may be defined as a measure of the actual performance of a content item compared to its predicted performance. For example, REP may be defined as:

$$REP(c_i) = \frac{P(c_i)}{P'(c_i)}$$

This value may be used in a decision of whether to change the location of a content item.

For example, content items with REP<1 may be demoted to poorer network addresses. Content items that are over-performing (REP>1) may be promoted and displayed on network addresses with greater traffic. Similarly, high REP content items may be paired with high REP network addresses.

Referring to FIGS. 10 and 11, REP data from either or both figures can be used to make a determination whether content should be moved. If so, the method can further comprise moving the content to a different network address (block 362 in FIG. 3).

Example of Quantitative Method

FIGS. 10 and 11 include information from the quantitative analysis. The last column ("Hits/E[Hits]") is an example of REP, where the performance statistic is "hits," which may be the number of requests in the network activity log in total. These figures show that for the Frequent Buyers' Club ("FBC"), reconditioned tools, outdoor products, and garden equipment all appear to be over-performers. FBC items have a very high REP of 3.1 and 1.9 for "/cpi/taf/fbc.taf|f=list" and "/cpi/taf/fbc.taf|-", respectively. Reconditioned tools ("/cpi/taf/category.taf|-|RECONED" and "RECONED") are only reached after approximately 17 clicks—they seem to be buried in the site—however, are attracting approximately 1.9 times the number of requests than would be expected at that location (REP=1.9). These content items may be changed to network addresses higher in the hierarchy and could be displayed closer to the main network address.

The shopping basket add, confirm, change, and associated actions (e.g., "/cpi/taf/basket.taf|actionarg=add"), all show very high REP values (e.g., the above-mentioned content item has an REP of 10). The reason for these large REP values is because these actions are only performed after a long period of continuous browsing on the site. Therefore, they appear to be attracting a lot of activity for their location. A site designer may examine these results and conclude that these content items probably should not be moved or optimized. This example underscores that it may be useful to have a human site designer interpret and understand the real-estate analysis results before taking actions to optimize the site.

The worst performers are the AboutUs and Auction screens ("/cpi/html/aboutus/main.html-" and "/cpi/taf/auction.taf|f=loginform", respectively). Auction login is situated only 9 clicks from the arrive-site address, however, has an REP of 0.01. This is 100 times fewer requests than other content in this location. Perhaps only a small number of customers actually have an auction account, and therefore, can login to auctions. In that case it may be moved off the main company page.

(iv-b) Visual Method

If the independent variable is location, then an alternative, graphical method may be employed. Under this embodiment, the method can involve computing the performance and location for various a content items, generating a graph relating location to performance, and reviewing the graph (blocks 424, 442, and 446 of FIG. 4). A curve may be super-imposed onto the graph for ease of readability (block 444). Using this graph, assessment can be made as to which content items should be promoted or demoted based on whether those content items appear significantly above the curve/preponderance of the points (in which case they should be considered for promotion) or significantly below the curve/preponderance of the points (in which case they should be considered for demotion). Content items close to the curve/preponderance of points may remain at their locations (e.g., insignificant difference between actual and predicted performance).

Example of Visual Method

Figure 9:
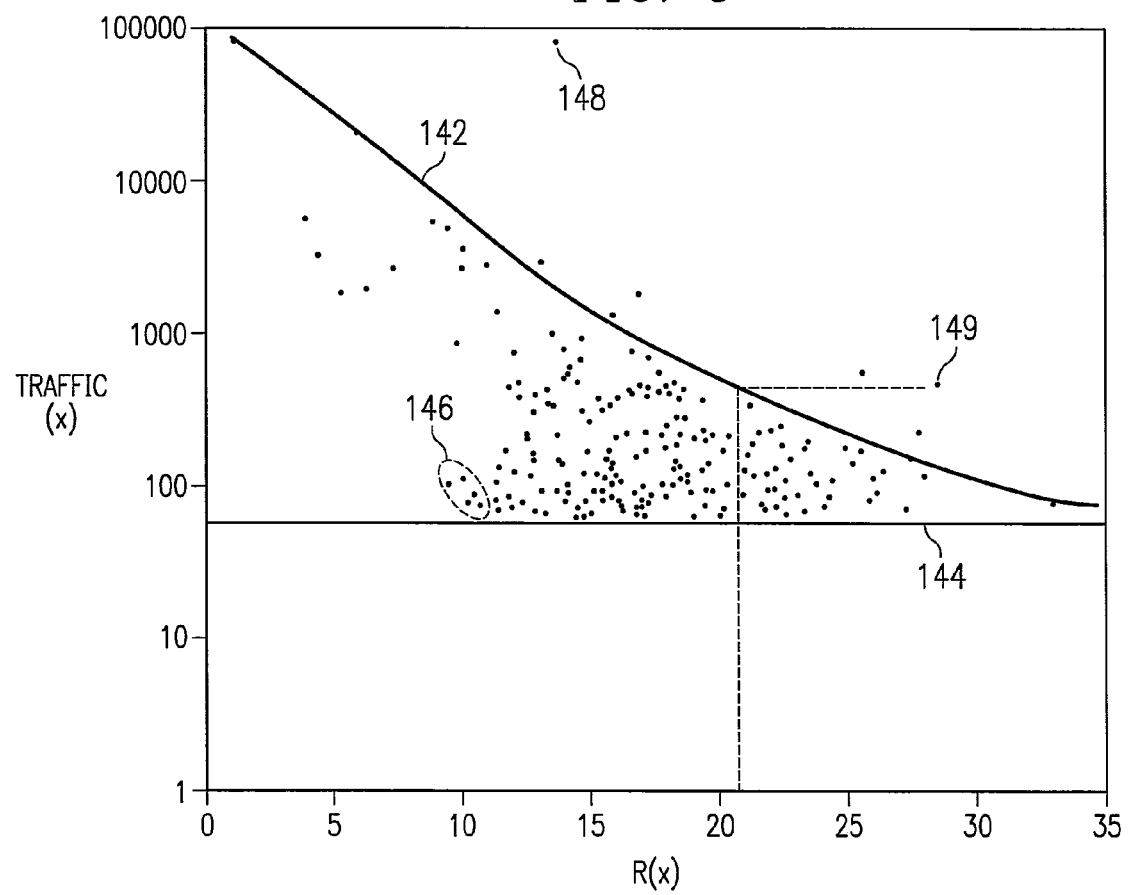
FIG. 9 includes a graph illustrating a relationship between traffic and click distance for content items.

FIG. 9 can be an example of such a graph and includes a semi-log plot with click distance (linear scale) along the x-axis and traffic (logarithmic scale) along the y-axis. The plot has some significant and useful information for the network site in its current configuration. Line 142 approximates the expected maximum traffic for a given click distance. Line 144 indicates a minimum amount of traffic is seen at most network addresses regardless of click distance.

Cluster 146 includes some content items that are typically requested early in a session with traffic close to line 144. The content within cluster 146 may be closer to a typical arrive-site network address than they should be. On the other end of the spectrum, content items 148 and 149 are requested significantly higher than would be predicted by their real-estate location. Content item 148 has an amount of traffic is about the same as an arrive-site network address. Content item 149 is currently at a location of approximately 29 clicks and has traffic that would correspond to a click distance of approximately 21 clicks.

A site designer may want to further investigate to determine if the traffic seen at network addresses within cluster 146 and content items 148 and 149 can be explained. For example, content item 148 may be on a landing network address that is accessed from an affiliated web site. This may explain why its traffic is high. Content item 148 may not be moved because its location may be logical within the layout of the network site.

One or more of the content items may be moved to a different network address (blocks 362 and 462 of FIGS. 3 and 4, respectively) with the objective of improving the overall site design. Some of the content items within cluster 146 may be moved to other network addresses with higher location scores, and content item 149 may be moved closer to a network address with a lower location score. Clearly other actions could be taken for the other content items shown in FIG. 9.

Other Embodiments

Many other embodiments are possible. For example, the concentric graph shown in FIG. 8 may be used. An unusually high performance for a content item near the outer portions of the concentric graph may signal that the item should be moved.

The methods described above can be performed at least on part on client computer 12, the server computer 16, or other computer (not shown). For the computers, a data readable storage medium can include code embodied therein, wherein the code includes instructions for carrying out acts of the method. A site designer may not want the computer to automatically move the content items because control over the network site may be lost or the content items may be placed at locations that are not logical to users at client computer 12. Still, the code can include an instruction for recommending that the particular content items be moved to a different location. For the performance statistic being investigated, a computer may recommend that a particular content item be moved to a location that is a different click distance from a reference content item such as the "index" page. Because the design of the network site should be cohesive, the site designer may be better able to review the recommendation of the computer to actuate a change if the site designer so desires.

In other embodiments, the approximations recited above may be replaced by equations. In other embodiments, the frame of reference for moving addressed from a fixed reference point, such as a main network site address.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method for analyzing performance of content items within a network site, comprising:

at a server computer having access to network activity information on the network site:

determining a location of a content item within the network site;

determining a predicted performance for the content item at the location;

determining an actual performance of the content item;

comparing the predicted performance to the actual performance;

based on the comparing, determining whether the content item is underperforming; and moving the content item to a new location within the network site responsive to the determining whether the content item is underperforming.

2. The method according to claim 1, wherein determining the predicted performance of the content item comprises analyzing a relationship between location and performance of other content items.

3. The method of claim 1, wherein determining the location of the content item comprises determining an average number of clicks it takes users to arrive at specific network address during a session at the network site.

4. The method of claim 1, wherein determining the actual performance of the content item comprises summing the number of session in which the content item is requested.

5. The method of claim 1, wherein the predicted performance of the content item is determined according to:

$$P'(c_i) \approx \sum_{d=1}^{D} [G(|r_d - L(c_i)|) \cdot t_d]$$

where:

$c_i$ represents the content item;

$L(c_i)$ is the location of the content item;

D is a number of basis functions used for the approximation $G(g)=g^2*\log(g)$;

$r_d$ is a prototypical location value for the $d^{th}$ basis function; and $t_d$ is a parameter value that is chosen to minimize the sum of squared errors below over a large "training set" of content items.

6. The method according to claim 2, wherein comparing the actual performance to the predicted performance comprises determining a real estate performance value according to:

$$REP(c_i) = \frac{P(c_i)}{P'(c_i)}.$$

7. The method according to claim 6, wherein if the content item has a REP<1, the content item is determined to be underperforming.

8. A data processing system readable storage medium having computer readable program code embodied therein, the computer readable program code adapted to be executed by a computer to implement a method for analyzing performance of content items within a network site, the computer readable program code comprising instructions executable to:

determine a predicted performance for the content item at the location;

determine an actual performance of the content item;

compare the predicted performance to the actual performance;

based on the comparison, determine if the content item is underperforming; and if the content item is underperforming, recommend moving the content item to a new location within the network site.

9. The data processing system of claim 8, wherein determining the predicted performance of the content item comprises analyzing a relationship between location and performance of other content items.

10. The data processing system of claim 8, wherein determining the location of the content item comprises determining an average number of clicks it takes users to arrive at a specific network address during a session at the network site.

11. The data processing system of claim 8, wherein determining the actual performance of the content item comprises summing the number of sessions in which the content item is requested.

12. The data processing system of claim 8, wherein the predicted performance of the content item is determined according to:

$$P'(c_i) \approx \sum_{d=1}^{D} [G(|r_d - L(c_i)|) \cdot t_d]$$

where:

$c_i$ represents the content item;

$L(c_i)$ is the location of the content item;

D is a number of basis functions used for the approximation $G(g)=g^2*\log(g)$;

$r_d$ is a prototypical location value for the $d^{th}$ basis function; and $t_d$ is a parameter value that is chosen to minimize the sum of squared errors below over a large "training set" of content items.

13. The data processing system of claim 12, wherein comparing the actual performance to the predicted performance comprises determining a real estate performance value according to:

$$REP(c_i) = \frac{P(c_i)}{P'(c_i)}.$$

14. The data processing system of claim 8, wherein if the content item has a REP<1, the content item is determined to be underperforming.

15. A data processing system for analyzing performance of content items within a network site, comprising:

a storage location storing network activity information on the network site; and a server computer coupled to the storage location comprising a processor and a computer readable storage medium storing computer executable instruction, the computer executable instructions comprising instructions executable to:

determine a predicted performance for the content item at the location;

determine an actual performance of the content item;

compare the predicted performance to the actual performance;

based on the comparison, determine if the content item is underperforming; and if the content item is underperforming, recommend moving the content item to a new location within the network site.

16. The data processing system of claim 15, wherein determining the predicted performance of the content item comprises analyzing a relationship between location and performance of other content items.

17. The data processing system of claim 15, wherein determining the location of the content item comprises determining an average number of clicks it takes users to arrive at a specific network address during a session at the network site.

18. The data processing system of claim 15, wherein determining the actual performance of the content item comprises summing the number of sessions in which the content item is requested.

19. The data processing system of claim 15, wherein the predicted performance of the content item is determined according to:

$$P'(c_i) \approx \sum_{d=1}^{D} [G(|r_d - L(c_i)|) \cdot t_d]$$

where:
$c_i$ represents the content item;
$L(c_i)$ is the location of the content item;
D is a number of basis functions used for the approximation
$G(g)=g^2*\log(g)$;
$r_d$ is a prototypical location value for the $d^{th}$ basis function; and
$t_d$ is a parameter value that is chosen to minimize the sum of squared errors below over a large "training set" of content items.

20. The data processing system of claim 19, wherein comparing the actual performance to the predicted performance comprises determining a real estate performance value according to:

$$REP(c_i) = \frac{P(c_i)}{P'(c_i)}.$$

21. The data processing system of claim 15, wherein if the content item has a REP<1, the content item is determined to be underperforming.

* * * * *